(12) United States Patent
de Ruffray

(10) Patent No.: US 9,945,408 B2
(45) Date of Patent: Apr. 17, 2018

(54) COUPLING SYSTEM

(75) Inventor: Patrick de Ruffray, Desertines (FR)

(73) Assignee: Patrick de Ruffray, Desertines (FR)

( * ) Notice: Subject to any disclaimer, the term of this patent is extended or adjusted under 35 U.S.C. 154(b) by 781 days.

(21) Appl. No.: 14/372,943

(22) PCT Filed: Jan. 18, 2012

(86) PCT No.: PCT/IB2012/050245
§ 371 (c)(1),
(2), (4) Date: Feb. 23, 2015

(87) PCT Pub. No.: WO2013/108078
PCT Pub. Date: Jul. 25, 2013

(65) Prior Publication Data
US 2015/0211559 A1    Jul. 30, 2015

(51) Int. Cl.
*F16B 21/04* (2006.01)
*F16B 7/02* (2006.01)
(Continued)

(52) U.S. Cl.
CPC ............ *F16B 7/02* (2013.01); *F16B 12/2009* (2013.01); *F16B 21/04* (2013.01); *F16B 5/10* (2013.01);
(Continued)

(58) Field of Classification Search
CPC .. F16B 5/10; F16B 7/042; F16B 7/105; F16B 7/20; F16B 12/2009; F16B 21/04;
(Continued)

(56) References Cited

U.S. PATENT DOCUMENTS 1,932,099 A * 10/1933 Cabana .................. A47L 13/252
15/143.1
3,161,264 A * 12/1964 Isaacson ............ A47B 96/1425
248/351
(Continued)

FOREIGN PATENT DOCUMENTS

DE        10344796 B3 *  6/2005  .............. F16B 9/023
DE     102004022389 A1   12/2005
GB         2456950 A      8/2009

*Primary Examiner* — Daniel J Wiley
(74) *Attorney, Agent, or Firm* — Hoffmann & Baron, LLP

(57) ABSTRACT

A coupling system comprising at least one male component and one female component, in which system the male component is inserted into the female component along a longitudinal axis that is common to the male and female components and is retained removably by the female component:—the male component comprising an elongate body of substantially cylindrical shape;—the female component comprising an elongate body of substantially cylindrical shape and having a longitudinal internal bore of dimensions suited to the insertion and retention of the male component and an open top end;—the male component being inserted into the female component through a movement of longitudinal displacement combined at the same time with a rotation by a quarter of a turn;—the male component comprising notches for blocking rotation and displacement along a longitudinal axis, these notches collaborating with complementary stops in the female component.

25 Claims, 4 Drawing Sheets

(51) Int. Cl.
*F16B 12/20* (2006.01)
*F16B 5/10* (2006.01)

(52) U.S. Cl.
CPC . *F16B 2012/2018* (2013.01); *Y10T 403/7009* (2015.01)

(58) Field of Classification Search
CPC ......... Y10T 403/7005; Y10T 403/7007; Y10T 403/7009; Y10T 24/4578; A44B 99/005
See application file for complete search history.

(56) References Cited

U.S. PATENT DOCUMENTS

| | | | | |
|---|---|---|---|---|
| 3,423,781 | A * | 1/1969 | Henson | A47L 13/24 15/145 |
| 4,398,322 | A * | 8/1983 | Ewen | F16B 21/04 24/595.1 |
| 4,749,318 | A * | 6/1988 | Bredal | F16B 37/122 411/180 |
| 5,685,730 | A * | 11/1997 | Cameron | H01R 13/6397 439/333 |
| 6,612,534 | B2 * | 9/2003 | Hennessey | F16M 11/28 248/161 |
| 6,898,824 | B2 * | 5/2005 | Zaltron | A63C 11/221 135/66 |
| 7,628,632 | B2 * | 12/2009 | Holland | H01R 13/6273 439/309 |
| 2006/0099838 | A1 * | 5/2006 | Meyers | E02F 9/006 439/134 |

* cited by examiner

COUPLING SYSTEM

CROSS-REFERENCE TO RELATED APPLICATIONS

The present application is a national phase application of PCT/IB2012/050245 filed on Jan. 18, 2012, the entirety of which is incorporated herein by reference.

BACKGROUND

The present invention relates to a coupling system, which can be used in various applications, especially for assembling construction elements, panels, wooden fittings, blocks, furniture, etc, made of metal, plastic or wood, for example.

Coupling systems, especially those intended for use in assembling elements involving one or more components are fairly well known. Generally, these multi-component coupling systems comprise a male component and a female component. An example of such a system is a bolt and nut. In a more sophisticated example, it is known to use a female component that is substantially cylindrical and hollow, with an opening extending over part of the cylinder's circumferential surface, and made therein, and a male component taking the shape of a screw or other elongated whole body, having at one extremity a coupling head which is of generally rounded shape and which is inserted into the opening from the outside at an angle of 90°. Coupling is consequently achieved by applying a rotation to the female component, generally between a quarter-turn and a half-turn, such that the head of the male component fits into a notch having a smaller diameter than the head of the male component, and which is provided for this purpose in the body of the female component. In this way, the male component is blocked into the female component, and coupling ensured. Unblocking of the coupling occurs by applying a counter-rotation of the female component in the opposite direction to release the head of the male component. These operations have to be carried out with a screwdriver or other appropriate tools.

The main disadvantage of such known coupling systems, including the one described above, is that the components making up the system are essentially separate elements. This means, for example, that when objects which have been assembled with these coupling systems are disassembled, it is necessary to be careful to keep the separate elements of the coupling system in order to avoid losing them. In the same way, it is generally impossible to move the disassembled or uncoupled objects, whilst keeping the various elements of the coupling system within said objects, as the components of the coupling system have a tendency to fall out, and thus potentially be lost.

SUMMARY

The present invention proposes a solution to the above disadvantages, consisting in the provision of a coupling system comprising at least a male component and a female component, wherein the male component is inserted into the female component along a longitudinal axis which is common to the male and female components, and is retained by the latter in a movable manner:

- the male component comprising a substantially cylindrical elongated body;
- the female component comprising a substantially cylindrical elongated body having an inner longitudinal bore of dimensions which are adapted to the insertion and retaining of the male component, and an open upper extremity;
- the male component is insertable into the female component via a simultaneous longitudinal displacement movement and a quarter-rotation movement;
- the male component including blocking means preventing longitudinal axis displacement and rotation, which cooperate with complementary stopping means present in the female component.

The coupling system proposed according to the present invention is an assembly of mutually cooperating components, of which the male and female components are never separated, and can advantageously be set in a closed position that is countersunk to the surface of one of the objects to be assembled, whereby the coupling system does not stick out over the surface external surface of the object and thereby avoids being either broken, or interfering with handling of the object when the latter is moved or during transport of assembled objects in which the coupling system according to the invention has been included.

As the coupling system according to the present invention is, due to the way it is designed, fairly flexible with regard to the various possible applications and uses to which it can be put, the male and female components can be made from various materials, and notably, out of metal, or plastic, the selection and manufacture of which belong to the skilled persons general knowledge. Examples of suitable methods of manufacture are stamping, or press-cutting, of metals or metal alloys, or even moulding of metal alloys or appropriate plastic materials.

Preferably, the complementary stopping means of the female component comprise projections extending from an inner surface of the elongated body of the female component into the inner bore of the latter.

Even more preferably, the complementary stopping means of the female component comprise projections located at diametrically opposed positions on the elongated body, for example, face to face. The projections of the complementary stopping means can be integrated, that is to say, contiguous, of the material in which the female composant is made, or alternatively can be elements added to the body of the female component. For example, where the female body is made of plastic material, the projections of the complementary stopping means can be directly moulded with the body of the female component. If the female component is made of metal or metal alloy, for example, by press-cutting, the projections of the complementary stopping means can also be press-cut at the same time, in an integrated manner, as the body of the female component.

The female component can include an open or closed lower extremity, but preferably this is closed. When the lower extremity is closed, it is also preferred that the female component include a projection located at the lower extremity on the longitudinale axis of the coupling system and within the bore of the elongated body of the female component.

In a preferred embodiment of the coupling system according to the invention, the female component includes elastic bearing means having a bearing surface that surrounds the female component, the aim being to enable the female component to be inserted and bear down on a housing provided for this purpose in the object to be assembled. These elastic bearing means are preferably projections which project outwardly from the outer surface of the elongated body of the female component. The projections can be integrated, that is to say, contiguous of the matter making up the female component, or alternatively, can be elements added to the body of the female component. For example, where the female component is made of plastic, the projections can be directly moulded with the body of the female component. If the female component is made of metal or metal alloy, for example, by press cutting, the projections can also be press-cut at the same time, and in an integrated manner, to the formation of the body of the female component.

Other ways of achieving the same result can also be envisaged, for example, by making the female component from a semi-rigid material, in which the body has an inverted vase shape starting from the lower extremity towards the upper extremity, such that when the female component is inserted into the housing provided therefor in the object to be assembled, the vase shape of the body is progressively elastically deformed, thereby exerting an outward push against the walls of the housing provided therefor in the object to be assembled.

Preferably, the elastic bearing means, having a bearing surface that surrounds the female component, are located at diametrically opposed positions on the elongated body of the female component, for example, face to face. The number of elastic bearing means is preferably between zero and eight, and more preferably, between one and four pairs of elastic bearing means, depending on the dimensions of the elongated body of the female component. In another preferred embodiment, the elastic bearing means consist of a peripheral annular edge, located around the periphery of, and projecting exteriorly from, the upper extremity of the female component.

Preferably, the male component includes a closed upper extremity, and even more preferably, the upper closed extremity is a push-button, intended to receive a pressing and rotating force, for example, from a finger or thumb, or a screwdriver, or any other suitable tool.

The lower extremity of the male component can be either closed or open. It is however preferred that the lower extremity of the male component be open.

Also preferably, the substantially cylindrically shaped elongated body of the male component includes an axial bore made within the elongated body along the longitudinal axis of the coupling system.

When the upper extremity of the elongated body of the male component is closed, this extremity preferably has a diameter less than the external diameter of the elongated body of the female component, but greater than an inner diameter of the elongated body of the female component. Such an arrangement enables, in particular, to avoid the possibility of friction or resistance from the male component with respect to the material from which the objects to be assembled are made, and the housings provided therein for the coupling system, when the male component is displaced, but additionally also provides the advantage, when the coupling system is in a closed position, that the upper extremity of the male component nevertheless covers and closes the bore of the female component, and thereby does not extend out beyond the housing provided in the object to be assembled, creating a visually pleasing esthetic effect to the eye.

It is also preferred that the elongated body of the male component extend in the shape of a projection from the upper extremity towards the lower extremity. In this case, it is additionally preferred that the projection of the elongated body of the male component have both a diameter which is less than that of the upper extremity of the male component, and less than an inner diameter of the elongated body of the female component. In this way, the projection of the elongated body of the male component can be inserted into the bore of the elongated body of the female component.

Insofar as the male component axial longitudinal displacement and rotational movement blocking means are concerned, these are preferably located on the projection of the elongated body. Preferably, but not obligatorily, the male component axial longitudinal displacement and rotational movement blocking means consist of a groove made in the projection of the elongated body of the male component. Even more preferably, the groove made in the projection of the elongated body of the male component is substantially parallel to the longitudinal axis of the coupling system.

Other configurations are also available with regard to the axial longitudinal displacement and rotational movement blocking means. For example, instead of having a groove that is substantially parallel to the longitudinal axis, one can provide an obliquely positioned groove, which would thereby effect a movement of translation and rotation of the elongated body of the male component at the same time as it is displaced along the longitudinal axis. Depending on the degree of inclination of the groove with regard to the longitudinal axis, a greater or lesser rotation can be achieved.

Preferably, the groove of the the longitudinal axis and rotational movement blocking means of the male component have an upper extremity and a lower extremity and present as notches that are contiguous with said groove, and located substantially orthogonally to the latter, with dimensions which are adapted to receive the stopping means of the female component.

Even more preferably, the groove and notches are made in a thickened area of the projection of the elongated body of the male component, which has a diameter less than the inner diameter of the female component. This thickened area defines, with the upper extremity of the male component an upper part of the elongated body of the male component having a lesser diameter than that of the upper extremity, but also a diameter less than that of the lower extremity of the male component.

Preferably, the coupling system according to the invention further includes a means for applying an elastic constraint, located inside the bore of the elongated body of the female component, and which fits into the interior of the elongated body of the male component. Preferably, the means for applying an elastic constraint is a spring, of which a lower extremity rests on the lower extremity of the axial bore of the elongated body of the female component, and is located around the axial projection of the latter, an upper extremity of said spring fitting into the axial bore of the elongated body of the male component. In this case, the means for applying an elastic constraint are located along the longitudinal axis of the coupling system. The means for applying an elastic constraint are housed inside the elongated body of the male component against a stop provided in the axial bore of said male component, the stop being located at a height less than the total length of the groove and lower than the corresponding position of the upper notch.

Thus, and preferably, the spring exerts an elastic constraint on the male component, which is applicable between an upper blocked position in which the stopping means are located at the upper extremity of the groove in the upper notch, and a lower blocked position in which the stopping means are located at the lower extremity of the groove in the lower notch.

Indeed, the upper blocked position corresponds to the situation when the coupling system is closed up, the male component being completely inserted and retained inside the female component, apart from the upper extremity which acts as a closure cap for the open upper extremity of the elongated body of the female component. This position is maintained against the elastic constraint exerted by the spring through the use of the projections of the stopping means, which come to bear stopping against a lower surface of the upper notch.

As regards, the lower blocked position, this corresponds to a situation in which the elongated body of the male component is pushed outside of the inner bore of the elongated body of the female component, thereby freeing the upper extremity of the male component and exposing the reduced diameter upper part of the latter. This position is maintained by the elastic constraint exerted by the spring, and via the projections of the stopping means which come to bear stopping against an upper surface of the lower notch.

The longitudinal displacement run of the male component within the elongated body of the female component is set in accordance with the dimensions of the of the male and female components, such that the desired functionality is obtained. It is however preferred that the longitudinal displacement run be substantially equal to the length of the groove made in the elongated body of the male component. Even more preferably, the longitudinal displacement run of the elongated body of the male component is less than a longitudinal dimension of the bore of the elongated body of the female component.

BRIEF DESCRIPTION OF THE DRAWINGS

The coupling system according to the present invention will further be described with reference to the following exemplary description of a detailed embodiment and accompanying drawings, in which:

FIG. 5A is a complementary representation of FIG. 4, in particular of the male component of the coupling system according to the invention, as seen side on;

DETAILED DESCRIPTION

The present example describes the application of the coupling system according to the present invention for the assembly of panels that make up a piece of furniture, for example, a wardrobe, shelves, cupboard, unit, etc. For the purposes of this example, the coupling system according to the invention can be embedded in panels made of wood, agglomerates, plastic, or metal, and more particularly, within the thickness of uprights that are 22 mm thick. Two systems, placed back to back, can fit in such a thickness. The upper extremity, or head, which can be sunk, of the elongate body of the male component should be sunk to be on a level with that of the surface of the upright. The total length of the coupling system is 11 mm when the head is in the sunken position, level with the surface of the upright. There are two columns of coupling systems per upright, each one measuring 8 mm in diameter and, generally not exceeding 10 mm in diameter. Each upright measures 50 mm in width. There is thus only a minimal amount of panel material or upright remaining unused after the housings for receiving the coupling systems have been drilled into the panels. The system allows for the male component to be released from, or trapped within, the female component. These operations are carried out with recourse to tools. The aim of the coupling system, when the furniture is disassembled, is to avoid having to leave an element sticking out from one of the side faces, or to be forced to remove the male component and store it separately in a bag when transporting the furniture from one place to another. In this way, it is possible to avoid scratches, catching on clothes, tearing of wallpaper, friction between metallic elements when the panels are disassembled and piled up in a truck or car, or even losing elements that have come loose from the panels. The whole assembly is therefore small, but very resistant since, when in use, the upper extremity of the male component is generally withdrawn and inserted in a corresponding housing of another panel or upright, and consequently, subject to important moments of traction. It is thus preferable to manufacture the components of the coupling system out of metal, particularly out of stainless steel, aluminium ou brass. The system could also be made from moulded plastic, by choosing a suitable plastic material having equivalent resistance to that of a metal system.

Figure 1:
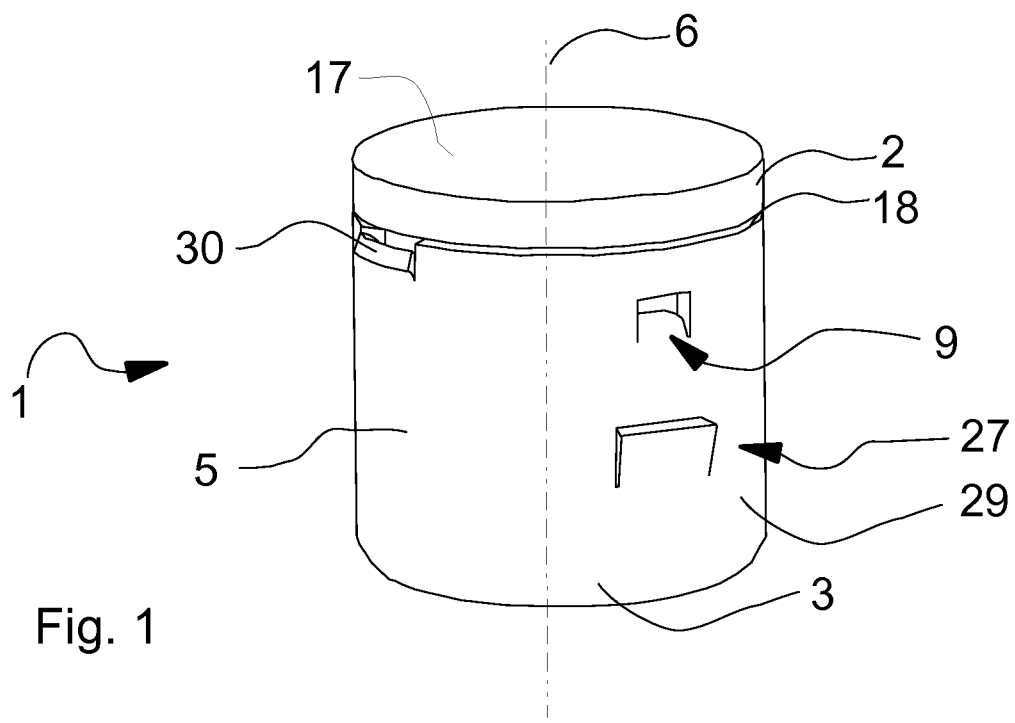
FIG. 1 is a false perspective representation of a coupling system according to the invention, in a closed position.
Figure 2:
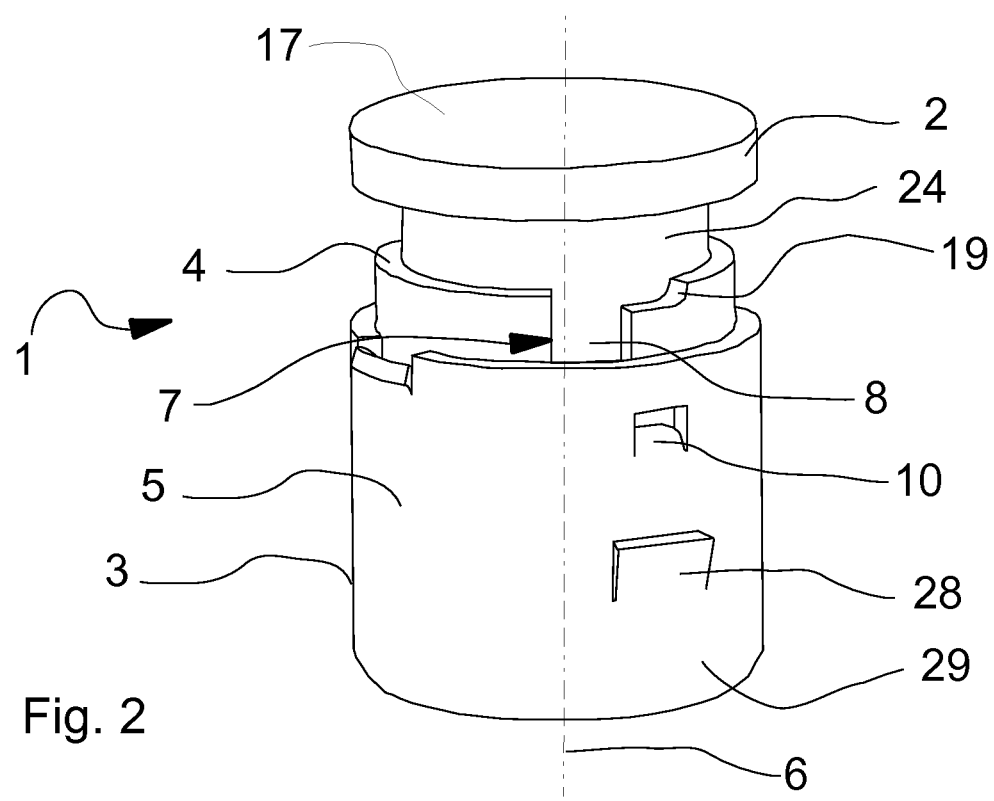
FIG. 2 is a false perspective representation of a coupling system according to the invention, in an open position.
Figure 3:
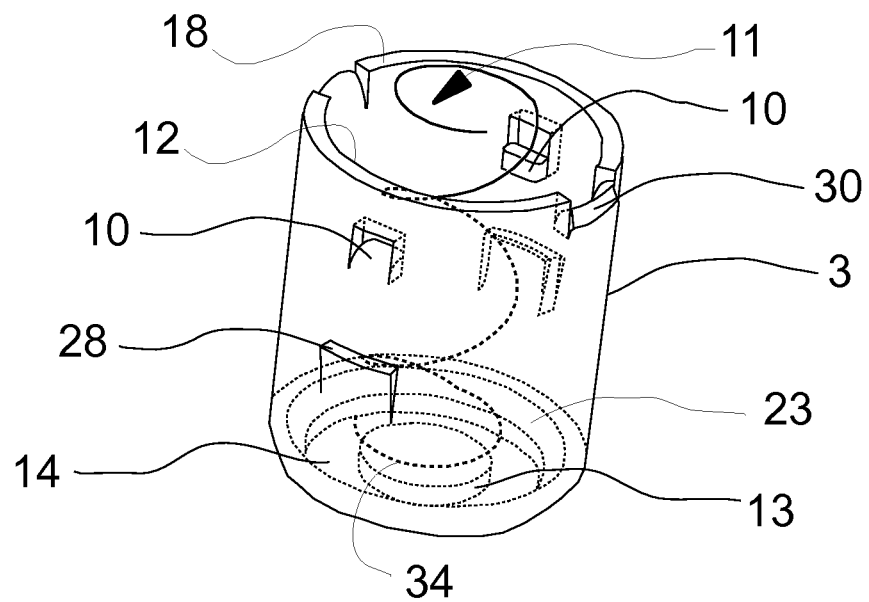
FIG. 3 is a false perspective representation of the female component of a coupling system according to the invention.
Figure 4:
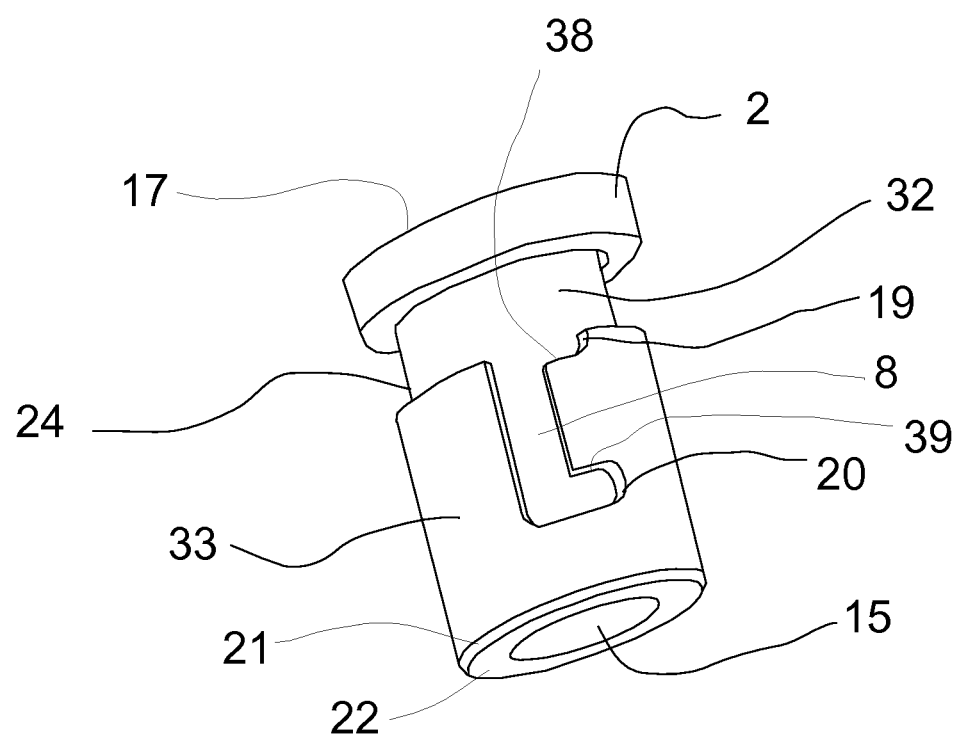
FIG. 4 is a false perspective representation of the male component of a coupling system according to the invention.
Figure 5A:
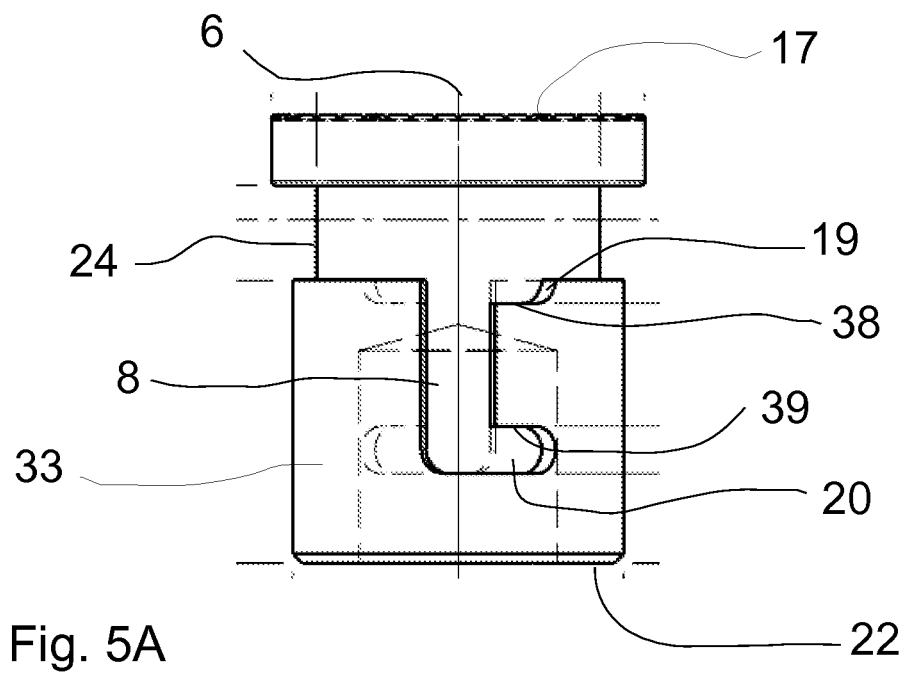
Figure 5B:
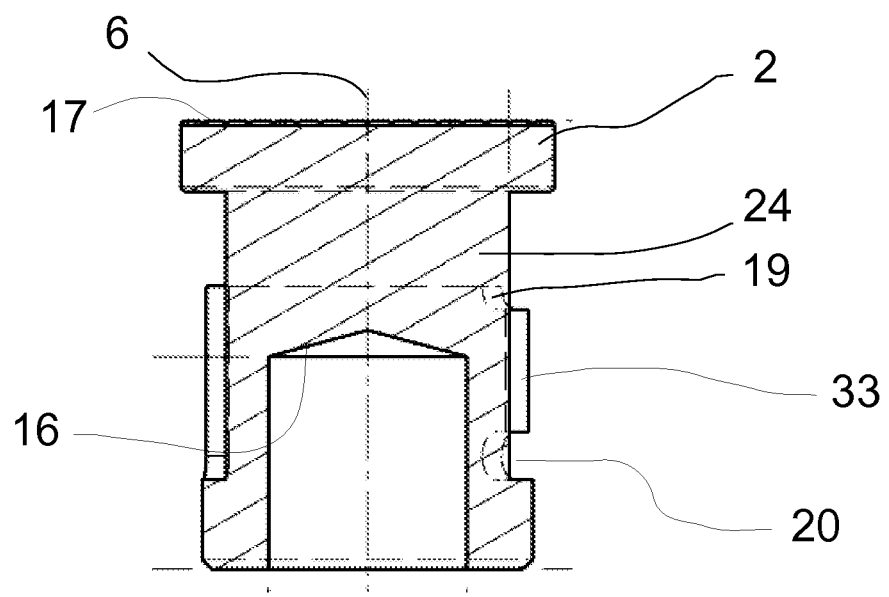
FIG. 5B is a complementary representation of FIG. 4, in particular the male component of the coupling system according to the invention, as seen in cross-section.
Figure 6:
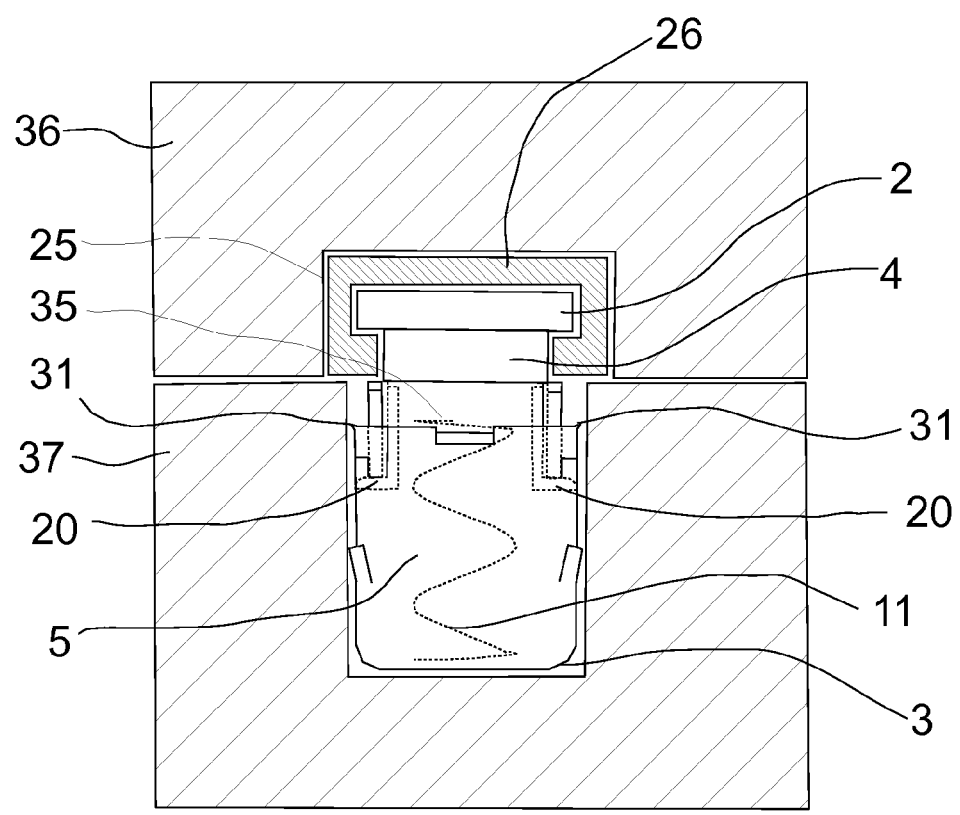
FIG. 6 is a schematic representation of the assembly of two objects using the coupling system according to the present invention, as seen in a simplified cross-sectional view.

The coupling system, as indicated generally in FIGS. 1 and 2 by the numeric reference (1), includes two main components: a male component (2) and a female component (3). The male component (2) and the female component (3) both have elongated bodies (4, 5), which are substantially cylindrical in shape. The female component (3) receives the male component (2), which moves from bottom to top within the female component (3), along a longitudinal axis (6) which is common to both components (2, 3). Rotational and longitudinal displacement blocking means (7) of the male component, in the shape of vertical grooves (8), are provided on either side of the elongated body (4) of the male component (2), as are complementary stopping means (9), which are provided in the female component (3) in the shape of projections (10) formed in the elongated body of the female component.

The male component (2) is displaced via an elastic axial constraint which takes the shape of a spring (11), held in a bore (12) of the elongated body (5) of the female component (3), with help from an inner axial projection (13), which projects upward from the lower extremity (14) of the female component (5) and rests in a bore (15) of the elongated body (4) of the male component (2). The lower extremity (34) of the spring (11) is held against a stop (16) provided in the bore (15) of the elongated body (4). The stop can have various configurations, for example, an annular edge located on the inner surface of the bore (15) or simply just an upper wall that defines the bottom of the bore (15).

The female component (3) includes, on its elongated body (5), two inner projections (10), the body, when made out of metal, being for example press-cut towards the inner of the bore (12). The projections (10) prevent the male component (2) from being released from the female component (3) and enable rotation of the male component (2) within the bore (12) of the female component (3) when a quarter-turn with the thumb or the index finger of the hand is applied, par example towards the left, in an unscrewing direction to release the male component (2), or from the left to the right, in a screwing direction, to block the male component (2) in the open or activated position. In the open or activated position, the upper extremity (17) of the male component is released. In the closed or deactivated position, however, the male component (2) is pushed in and the upper extremity (17) is level with the upper extremity (18) of the female component (3).

The elongated body (4) of the male component (2) includes a projection (32) which has a reduced diameter in its upper portion (24) in comparison to the portion or thickened area (33) bearing the grooves (7, 8), and the upper extremity (17).

The grooves (7, 8), which are made in the elongated body (4) of the male component (2) have lower notches (20) at the upper extremity (39), enabling the male component (2) to be blocked in the activated position by the lower notches (20). If the coupling system is not useful for the purposes of assembling the piece of furniture, or if the latter has been disassembled, the male component (2) is in a closed or pushed-in position. To achieve this, one presses on the upper extremity (17) of the male component (2) to cause a longitudinal displacement movement along the longitudinal axis of the system, and at the same time, a quarter-turn rotation, such that the projections (10) move within the vertical groove (7, 8) of the male component (2). Then, by pressing on the spring (11), the elongated body (4) of the male component (2) is pushed into the bore (12) of the elongated body (5) of the female component (3) right up to the upper stop of the vertical groove (7, 8), then a quarter-turn is imparted from right to left, in the screwing direction, to lodge the projections (10) of the stopping means (9) in the upper notches (19) at the upper extremity (38) of the elongated body (4) of the male component (2), thereby maintaining the latter in the closed position.

The elongated body (4) of the male component (2) can be provided with a bevel (21) at its lower extremity (22), so that the male component (2), when in the closed position, rests firmly on the bottom of the elongated body (5) of the female component (3), in contact with an inner bevel (23) located at its lower extremity (14).

The upper extremity (17) of the male component (2) can be grooved along all or part of its outer surface, thereby providing a roughness that prevents digits from slipping, for example the thumb or index finger, when applying the quarter-turn rotation in one direction or the other.

As indicated above, the elongated body (4) of the male component (2) includes a projection (32) which has a reduced diameter in its upper portion (24) in comparison to the portion bearing the grooves (7, 8) and upper extremity (17). This upper portion (24) of reduced diameter prevents the upper extremity (17) of the male component (2) from being removed from its housing when the upper extremity (17) is slid into a housing (36) provided in the panel or object to be assembled. This housing (25) can be provided as a hollow, and contain a closing plate (26), the dimensions of which are adapted to receive said upper extremity (17). The closure plate (26) can be screwed, glued or otherwise affixed in any appropriate manner into the housing provided in the object or panel to be assembled.

In order to prevent the coupling system assembly from being removed from a housing in which it is intended to be inserted, for example, a perforation 8 mm in diameter made in the panels or objects to be assembled, the female component (3) can be provided with elastic bearing means (27) taking the shape of outer projections (28) located in the lower portion (29) of the elongated body (5) of the female component (3). These are preferably located in axial alignment beneath the projections (10) of the stopping means (9). It is also possible to provide elastic bearing means as projections (30) located near to, or at, the upper extremity (18) of the elongated body (5) of the female component (3). In this way, the female component (3), once inserted into the mass of the object to be assembled will not be likely to fall out of its housing (37) within the wood or other material of which the object to be assembled is made. In another embodiment, but one which is also preferred because it is simple to set up, the elastic bearing means can be made up of a peripheral annular edge (31), located around the periphery, and projecting out from, the upper extremity of the female component. Indeed, in such a configuration, it was discovered that it was even possible to remove the outer projections (28, 30).

The invention claimed is:

1. A coupling system comprising at least a male component and a female component, wherein the male component is insertable into the female component along a longitudinal axis common to the male and female components, and is retained by the female component in a movable manner:
    the male component comprising a substantially cylindrical elongated body having a first diameter and comprising a groove, a lower notch and a thickened area having a second diameter, wherein the first diameter is less than the second diameter, and wherein the groove and the lower notch are formed in the thickened area, the groove extending parallel to the longitudinal axis and the lower notch contiguous with and located substantially orthogonally to the groove;
    the female component comprising a substantially cylindrical elongated body having an axial bore of dimensions which are adapted to the insertion and retaining of the male component, and an open upper extremity;
    the male component is insertable into the female component via a simultaneous longitudinal displacement movement and a quarter-rotation movement; and
    the male component including blocking means preventing longitudinal axis displacement and rotation, which cooperate with complementary stopping means present in the female component.

2. The coupling system according to claim 1, wherein the complementary stopping means of the female component comprise projections extending from an inner surface of the elongated body of the female component into the axial bore of the latter.

3. The coupling system according to claim 1, wherein the complementary stopping means of the female component comprise projections located at diametrically opposed positions on the elongated body.

4. The coupling system according to claim 1, wherein the female component includes a closed lower extremity.

5. The coupling system according to claim 4, wherein the female component includes a projection located at the lower extremity of the female component on the longitudinal axis and inside the axial bore of the elongated body of the female component.

6. The coupling system according to claim 1, wherein the female component includes elastic bearing means having a bearing surface that surrounds the female component.

7. The coupling system according to claim 6, wherein the elastic bearing means consist of a peripheral annular edge, located around the periphery of, and projecting exteriorly from, the upper extremity of the female component.

8. The coupling system according to claim 6, wherein the elastic bearing means are projections which project outwardly from an outer surface of the elongated body of the female component.

9. The coupling system according to claim 8, wherein the elastic bearing means, having a bearing surface that surrounds the female component, are located at diametrically opposed positions on the elongated body of the female component.

10. The coupling system according to claim 1, wherein the male component includes a closed upper extremity.

11. The coupling system according to claim 10, wherein the male component includes a lower open extremity.

12. The coupling system according to claim 11, wherein the elongated body of the male component extends in the shape of a projection from the upper extremity towards the lower extremity.

13. The coupling system according to claim 12, wherein the projection of the elongated body of the male component has a diameter which is greater than that of the upper extremity of the male component, and less than an inner diameter of the elongated body of the female component.

14. The coupling system according to claim 12, wherein the longitudinal axis displacement and rotational movement blocking means of the male component are located on the projection of the elongated body.

15. The coupling system according to claim 12, wherein the longitudinal axis displacement and rotational movement blocking means of the male component comprise the groove made in the projection of the elongated body of the male component.

16. The coupling system according to claim 1, wherein the substantially cylindrical elongated body of the male component includes an axial bore made within the elongated body along the longitudinal axis of the coupling system.

17. The coupling system according to claim 1, wherein the elongated body of the male component includes a closed upper extremity, which has a diameter less than the external diameter of the elongated body of the female component, but greater than an inner diameter of the elongated body of the female component.

18. The coupling system according to claim 1, wherein the longitudinal axis and rotational movement blocking means of the male component have an upper extremity and a lower extremity, wherein the male component further comprises an upper notch in the thickened area contiguous with and located substantially orthogonally to the groove, and wherein the upper notch and the lower notch are located at the upper extremity and the lower extremity, respectively, with dimensions which are adapted to receive the stopping means of the female component.

19. The coupling system according to claim 1, wherein the thickened area has a diameter less than an inner diameter of the female component.

20. The coupling system according to claim 1, which further includes a means for applying an elastic constraint, located inside the axial bore of the elongated body of the female component, and which fits into an interior of the elongated body of the male component.

21. The coupling system according to claim 20, wherein the means for applying an elastic constraint is a spring, of which a lower extremity rests on the lower extremity of the axial bore of the elongated body of the female component, and is located around an axial projection of the latter, an upper extremity of said spring fitting into an axial bore of the elongated body of the male component.

22. The coupling system according to claim 21, wherein the spring exerts an elastic constraint on the male component, which is applicable between an upper blocked position in which the stopping means are located at an upper extremity of the groove in an upper notch, and a lower blocked position in which the stopping means are located at the lower extremity of the groove in the lower notch.

23. The coupling system according to claim 20, wherein an upper extremity of the means for applying an elastic constraint fits against a stop provided in an axial bore of the elongated body of the male component, said stop being located at a height less than the total length of the groove and lower than the corresponding position of an upper notch made in the thickened area of the male component.

24. The coupling system according to claim 1, wherein the run of longitudinal movement of the elongated body of the male component inside the elongated body of the female component is substantially equal to a length of the groove made in the elongated body of the male component.

25. The coupling system according to claim 24, wherein the run of longitudinal movement of the elongated body of the male component is less than a longitudinal dimension of the axial bore of the elongated body of the female component.

* * * * *